United States Patent
Wang (10) Patent No.: US 10,990,278 B2
(45) Date of Patent: Apr. 27, 2021

(54) METHOD AND DEVICE FOR CONTROLLING INFORMATION FLOW DISPLAY PANEL, TERMINAL APPARATUS, AND STORAGE MEDIUM

(71) Applicant: BEIJING MICROLIVE VISION TECHNOLOGY CO., LTD, Beijing (CN)

(72) Inventor: Ya Wang, Beijing (CN)

(73) Assignee: Beijing Microlive Vision Technology Co., Ltd., Beijing (CN)

( * ) Notice: Subject to any disclaimer, the term of this patent is extended or adjusted under 35 U.S.C. 154(b) by 0 days.

(21) Appl. No.: 17/021,334

(22) Filed: Sep. 15, 2020

(65) Prior Publication Data

US 2021/0026529 A1    Jan. 28, 2021

Related U.S. Application Data

(63) Continuation of application No. PCT/CN2018/124742, filed on Dec. 28, 2018.

(30) Foreign Application Priority Data

Jun. 29, 2018 (CN) .......................... 201810697514.5

(51) Int. Cl.
  *G06F 3/0488* (2013.01)
  *G06F 3/0485* (2013.01)
  *G06F 3/041* (2006.01)

(52) U.S. Cl.
  CPC ........ *G06F 3/04883* (2013.01); *G06F 3/0485* (2013.01); *G06F 3/041* (2013.01)

(58) Field of Classification Search
  CPC ..... G06F 3/04883; G06F 3/0485; G06F 3/041
  See application file for complete search history.

(56) References Cited

U.S. PATENT DOCUMENTS

2003/0043174 A1\* 3/2003 Hinckley ............ G06F 3/04855
  345/684
2013/0268883 A1\* 10/2013 Kim .................... G06F 3/04847
  715/784

(Continued)

FOREIGN PATENT DOCUMENTS

CN    102436351 A    5/2012
CN    102779004 A    11/2012

(Continued)

OTHER PUBLICATIONS

International Search Report and Written Opinion dated Mar. 27, 2019 for PCT Patent Application No. PCT/CN2018/124742.

(Continued)

*Primary Examiner* — Seth A Silverman
(74) *Attorney, Agent, or Firm* — Thomas Horstemeyer, LLP (57) ABSTRACT

Provided are a method and device for controlling information flow display panel, a terminal apparatus and a storage medium. The method includes: determining, in response to detecting a sliding gesture on the information flow display panel and in a case where the sliding gesture is determined as a set sliding gesture, a sliding starting point of the sliding gesture according to a region where the sliding gesture is located; determining, in response to detecting a release operation of the sliding gesture, a sliding distance of the sliding gesture; and closing the information flow display panel based on a determination that the sliding distance is greater than or equal to a set threshold.

11 Claims, 9 Drawing Sheets

(56) References Cited

U.S. PATENT DOCUMENTS

| | | | | |
|---|---|---|---|---|
| 2014/0298254 A1* | 10/2014 | Peng | ............... | G06F 3/0482 |
| | | | | 715/800 |
| 2014/0362123 A1* | 12/2014 | Kawahara | ............ | G06F 3/0485 |
| | | | | 345/684 |
| 2015/0169196 A1* | 6/2015 | Lee | ................. | G06F 3/04883 |
| | | | | 715/799 |

FOREIGN PATENT DOCUMENTS

| | | | |
|---|---|---|---|
| CN | 103425431 | A | 12/2013 |
| CN | 103677576 | A | 3/2014 |
| CN | 104049900 | A | 9/2014 |
| CN | 106250038 | A | 12/2016 |
| CN | 106354404 | A | 1/2017 |
| CN | 106383635 | A | 2/2017 |
| CN | 109085984 | A | 12/2018 |

OTHER PUBLICATIONS

1st Search Report dated May 8, 2019 for Chinese Patent Application No. 201810697514.5.
Supplementary Report dated Aug. 02, 2019 for Chinese Patent Application No. 201810697514.5.
1st Office Action dated Aug. 29, 2019 for Chinese Patent Application No. 201810697514.5.

* cited by examiner

METHOD AND DEVICE FOR CONTROLLING INFORMATION FLOW DISPLAY PANEL, TERMINAL APPARATUS, AND STORAGE MEDIUM

CROSS REFERENCE TO RELATED APPLICATIONS

This is continuation of International Patent Application No. PCT/CN2018/124742, filed on Dec. 28, 2018, which is based on and claims priority to Chinese Patent Application No. 201810697514.5 filed with the CNIPA on Jun. 29, 2018, disclosures of which are incorporated herein by reference in their entireties.

TECHNICAL FIELD

Embodiments of the present disclosure relate to the field of Internet technologies and, for example, relate to a method and device for controlling an information flow display panel, a terminal apparatus, and a storage medium.

BACKGROUND

Along with the continuous development of the Internet and information technology, more and more Internet applications are provided on a terminal. The Internet applications on the terminal can display the information flow obtained through interaction with a server on an information flow display panel.

In the related art, in a case where a user has viewed the information flow on the information flow display panel, and wants to close the information flow display panel, the user should find a close button (such as a return button) and then click the button to close the display panel, therefore, the operation is complicated. Moreover, since a position of the close button is fixed, it is more inconvenient for the user to operate with one hand as a screen gets larger and larger.

SUMMARY

In view of the above, embodiments of the present disclosure provide a method and device for controlling an information flow display panel, a terminal apparatus and a storage medium, so as to simplify user operations, facilitate one-handed operations by users, and improve user experience.

A method for controlling information flow display panel is provided in an embodiment of the present disclosure and includes steps described below.

In response to detecting a sliding gesture on the information flow display panel and in a case where the sliding gesture is determined as a set sliding gesture, a sliding starting point of the sliding gesture is determined according to a region where the sliding gesture is located.

In response to detecting a release operation of the sliding gesture, a sliding distance of the sliding gesture is determined.

The information flow display panel is closed based on a determination that the sliding distance is greater than or equal to a set threshold.

A device for controlling information flow display panel is provided in an embodiment of the present disclosure. The device includes a sliding starting point determination module, a sliding distance determination module and a display panel closing module.

The sliding starting point determination module is configured to determine, in response to detecting a sliding gesture on the information flow display panel and in a case where the sliding gesture is determined as a set sliding gesture, a sliding starting point of the sliding gesture according to a region where the sliding gesture is located.

The sliding distance determination module is configured to determine, in response to detecting a release operation of the sliding gesture, a sliding distance of the sliding gesture.

The display panel closing module is configured to close the information flow display panel based on a determination that the sliding distance is greater than or equal to a set threshold.

A terminal apparatus is further provided in an embodiment of the present disclosure. The terminal apparatus includes: a memory configured to store instructions; and one or more processors coupled to the memory, the one or more processors configured, in conjunction with execution of the instructions stored in the memory, to: at least one processor, which is configured to: determine, in response to detecting a sliding gesture on the information flow display panel and in a case where the sliding gesture is determined as a set sliding gesture, a sliding starting point of the sliding gesture according to a region where the sliding gesture is located; determine, in response to detecting a release operation of the sliding gesture, a sliding distance of the sliding gesture; and close the information flow display panel based on a determination that the sliding distance is greater than or equal to a set threshold.

An embodiment of the present disclosure further provides a non-transitory computer-readable storage medium configured to store a computer program, where the computer program, when executed by a processor, performs steps of: determining, in response to detecting a sliding gesture on the information flow display panel and in a case where the sliding gesture is determined as a set sliding gesture, a sliding starting point of the sliding gesture according to a region where the sliding gesture is located; determining, in response to detecting a release operation of the sliding gesture, a sliding distance of the sliding gesture; and closing the information flow display panel based on a determination that the sliding distance is greater than or equal to a set threshold.

DETAILED DESCRIPTION

The present disclosure will be further described in detail with reference to drawings and embodiments. It is to be understood that the embodiments described herein are intended to illustrate and not to limit the present disclosure. In addition, it is to be noted that to facilitate description, only part, not all of content related to the present disclosure are illustrated in the drawings.

Embodiment One

Figure 1:
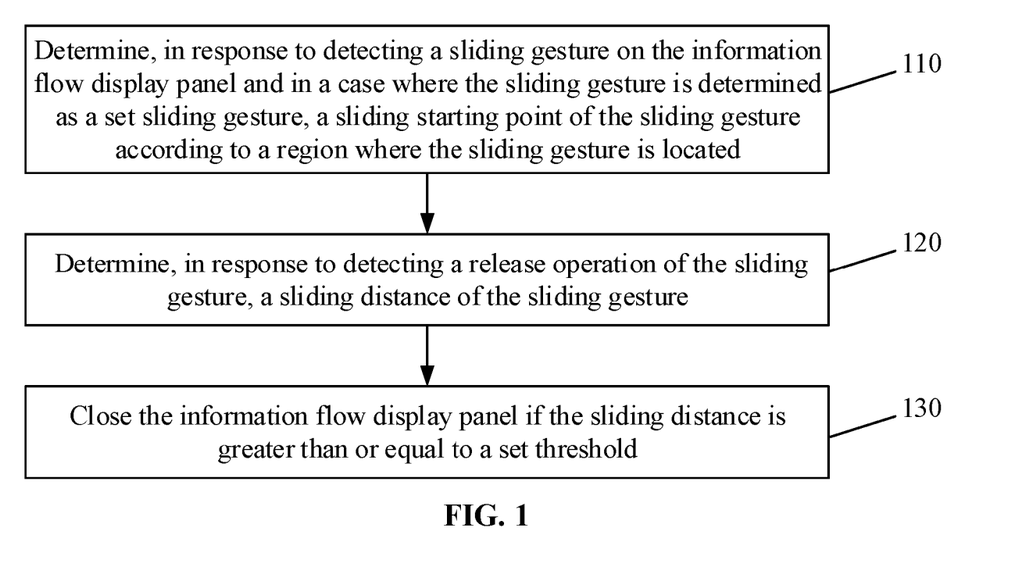
FIG. 1 is a flowchart of a method for controlling information flow display panel according to embodiment one of the present disclosure.

FIG. 1 is a flowchart of a method for controlling information flow display panel according to embodiment one of the present disclosure. The present embodiment may be applicable to a case where the information flow display panel is closed by a sliding gesture. The method may be performed by a controlling device for the information flow display panel. This device may be implemented by at least one of software or hardware and are generally integrated into a terminal apparatus such as a mobile phone or a tablet computer. The method includes steps of S110, S120 and S130.

In step S110, in response to detecting a sliding gesture on the information flow display panel and in a case where the sliding gesture is determined as a set sliding gesture, a sliding starting point of the sliding gesture is determined according to a region where the sliding gesture is located.

The information flow display panel may display a variety of information flows, and the information flows may be summarized for displaying. For example, the displayed information flow may include songs and comment information, etc. The set sliding gesture may include a down sliding gesture, an up sliding gesture, a left sliding gesture, or a right sliding gesture, and for example, may be set as the down sliding gesture. In a case where the sliding gesture is a closing gesture and a preset condition (such as a sliding distance of the sliding gesture is greater than or equal to a set threshold) is satisfied, a function of closing the information flow display panel may be achieved. The information flow display panel is not limited to be displayed on an entire region of a display screen, but may also be displayed on a partial display region on the display screen, such as a display region occupied during split-screen display, a circular region, or the like.

Figure 2A:
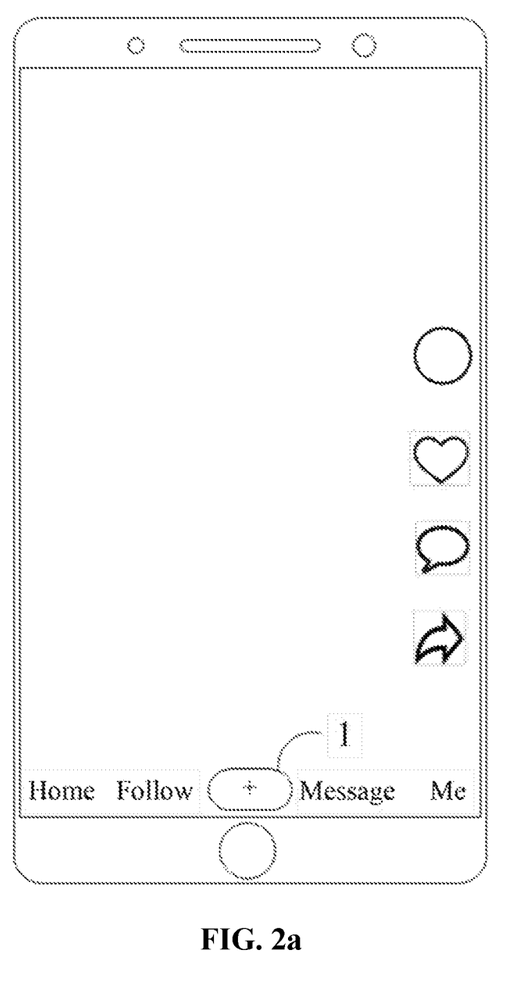
FIG. 2a is a schematic diagram of a previous page of an information flow display panel according to an embodiment of the present disclosure.
Figure 2B:
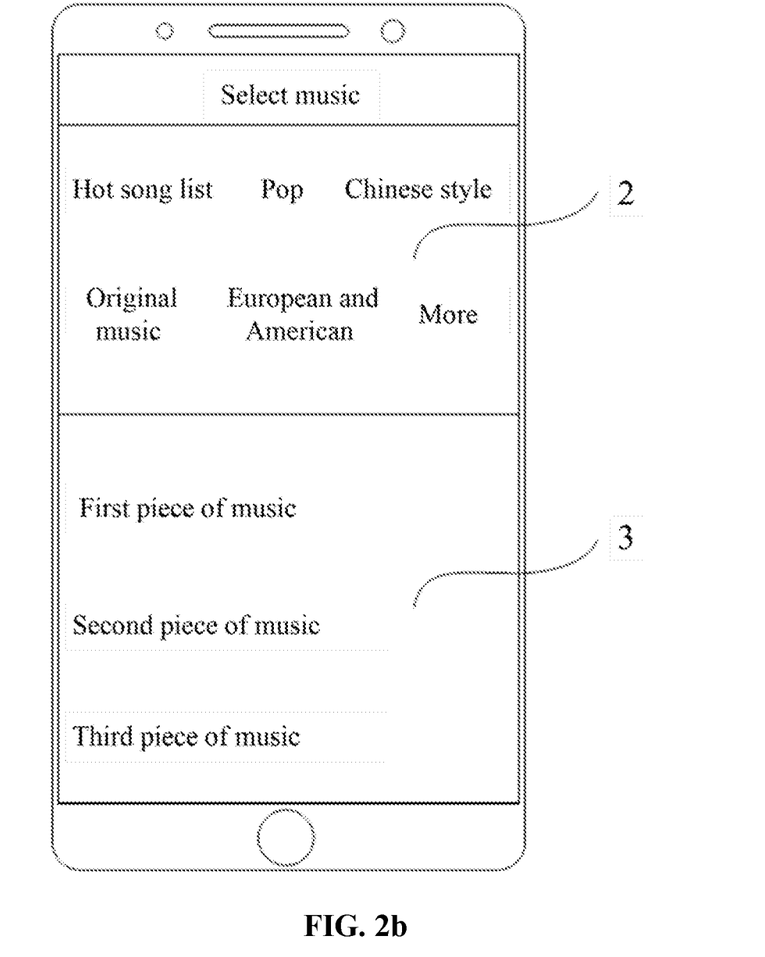
FIG. 2b is a schematic diagram of an information flow display panel according to an embodiment of the present disclosure.

As an example, the information flow display panel is a music selection page. As shown in FIG. 2a, when a user clicks on an operation control 1 in a previous page of the information flow display panel to display the information flow display panel, the information flow display panel appears from below a display region and moves upward until it covered an entire display region. At the same time, an information flow browsing request is sent to a server, and then the server responds to the information flow browsing request and returns correct information flow, therefore the information flow returned by the server is displayed on the information flow display panel. As shown in FIG. 2b, the information flow display panel includes an information flow classification information display region 2 and an information flow display region 3. When the server does not respond to the information flow browsing request or the server responds to the information flow browsing request with wrong information, an abnormal page may be displayed on the information flow display panel.

When the sliding gesture is determined as the set sliding gesture, whether the sliding gesture may be served as the closing gesture of the information flow display panel and the sliding starting point of the sliding gesture may be determined according to whether the region where the sliding gesture is located is located in an active region of the existing control of a trigger gesture in which the trigger gesture is the set sliding gesture, that is, when the region where the sliding gesture is located is located in the active region of the existing control, an operation of the existing control is firstly responded, and if the sliding gesture continues to slide after the operation of the existing control is completed, a touch point after the operation of the existing control is completed can be determined as the sliding starting point of the sliding gesture. When the region where the sliding gesture is located is located outside the active region of the existing control, the starting touch point of the sliding gesture is determined as the sliding starting point of the sliding gesture. In a case where the sliding gesture is the set sliding gesture and the set sliding gesture is different from the trigger gesture of the existing control in the information flow display panel, the starting touch point of the sliding gesture is directly determined as the sliding starting point of the sliding gesture.

In step S120, in response to detecting a release operation of the sliding gesture, a sliding distance of the sliding gesture is determined.

The release operation includes a finger lifting operation or receiving an interrupt trigger event. The interrupt trigger event includes a telephone incoming call event, a HOME key trigger event, receiving prompt information or low power prompt of a system, etc.

In response to detecting the release operation of the sliding gesture, a touch point before the release operation is served as a sliding end point of the sliding gesture, and the sliding distance of the sliding gesture is calculated according to the sliding starting point and the sliding end point of the sliding gesture. When the set sliding gesture is the down sliding gesture or the up sliding gesture, the sliding distance is a displacement component parallel to a long side of the display screen. When the set sliding gesture is the left sliding gesture or the right sliding gesture, the sliding distance is a displacement component parallel to a short side of the display screen. The sliding distance may be represent as a specific distance value, and may also be represented as pixel points slid by the sliding gesture, or may also be represented as a proportion of length in the corresponding direction of the display region, for example, may be set as a proportion, which can be applied to display regions with different sizes.

In step S130, the information flow display panel is closed based on a determination that the sliding distance is greater than or equal to a set threshold.

The set threshold may be a set threshold of a specific distance, may also be the number of set pixel points, or may also be a set proportion in the corresponding direction in which the set sliding gesture slides across the display region. For example, in a case where the set sliding gesture is a down sliding gesture, the set threshold is a set proportion of the down sliding gesture sliding in the direction parallel to a long side of the display screen.

In a case where the sliding distance of the sliding gesture is greater than or equal to the set threshold, the closing condition of the information flow display panel is satisfied and then the information flow display panel is closed. In a case where the release operation of the sliding gesture is the telephone incoming call event, an incoming page is displayed. In response to the telephone incoming call event is processed and the performed application program is returned to the application program corresponding to the information flow display panel, an previous page of the information flow display panel is displayed. In a case where the release operation of the sliding gesture is the HOME key trigger event, the previous page of the information flow display panel is displayed in response to the application program corresponding to the information flow display panel is performed by the user. Similarly, in a case where the release operation of the sliding gesture is receiving prompt information or low power prompt of the system, the information flow display panel is closed during the prompt is displayed, and then the previous page of the information flow display panel is displayed. As an example, the information flow display panel is a music selection page in video sharing software. A previous page of the information flow display panel is displayed after the information flow display panel is closed, where the previous page is as shown in FIG. 2a.

In a case where the corresponding gesture operation is still detected after the information flow display panel is closed, the closed information flow display panel is displayed again, where the corresponding gesture operation may be a gesture operation from a border of the display region and opposite to the set sliding gesture, or an operation corresponding to a control (such as a re-popup control), etc., so as to quickly reopen the information flow display panel after misoperation.

According to the method for controlling the information flow display panel provided by the embodiment, in response to detecting a sliding gesture on the information flow display panel, the information flow display panel is closed based on a determination that the sliding distance is greater than or equal to a set threshold Therefore, the user can close the information flow display panel through gesture interaction without looking for the close button, so as to simplifying user operations, facilitating one-handed operations by users, and improving user experience.

In an embodiment, determining the sliding starting point of the sliding gesture according to the region where the sliding gesture is located includes steps described below.

In a case where the sliding gesture is located within an active region of a scrollable browsing control, a scrolling operation of a browsing control is responded, and when the browsing control is non-scrollable, a non-scrollable touch point is determined as the sliding starting point of the sliding gesture.

In a case where the sliding gesture is located outside the active region of the scrollable browsing control, a starting touch point of the sliding gesture is determined as the sliding starting point of the sliding gesture.

In a case where the trigger gesture of the scrollable browsing control is the set sliding gesture, and the region where the sliding gesture is located is within the active region of the scrollable browsing control, the scrolling operation of the browsing control is preferentially responded.

Figure 2C:
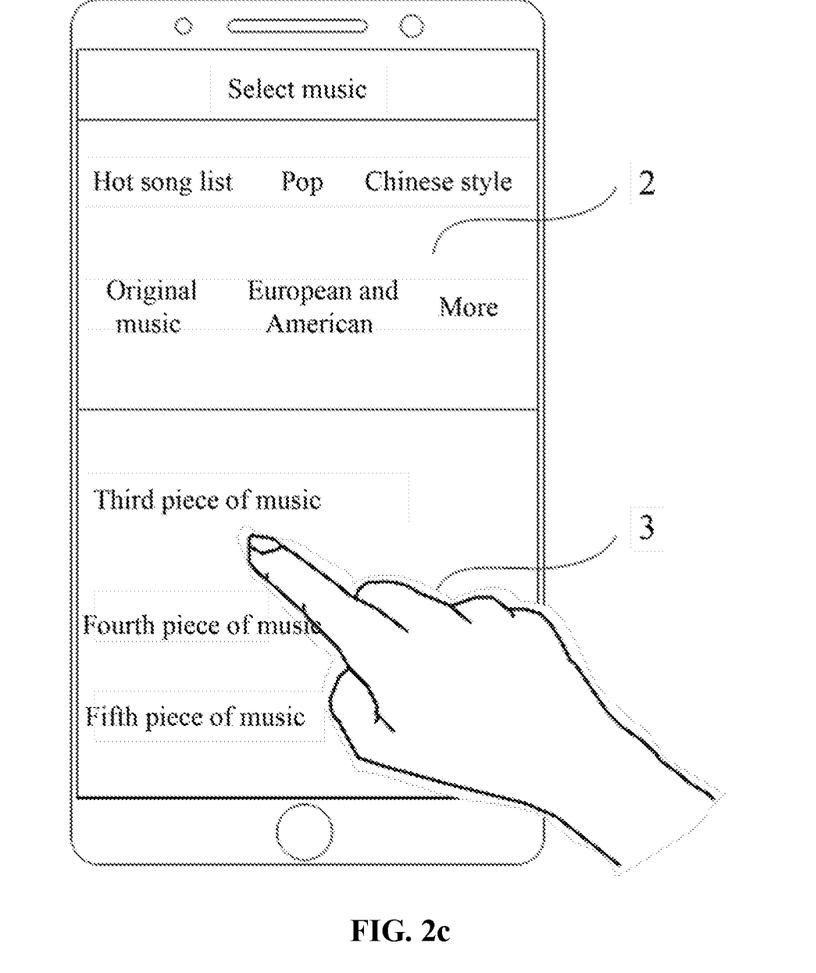
FIG. 2c is a schematic diagram of a sliding gesture located within an active region of a scrollable browsing control according to an embodiment of the present disclosure.
Figure 2D:
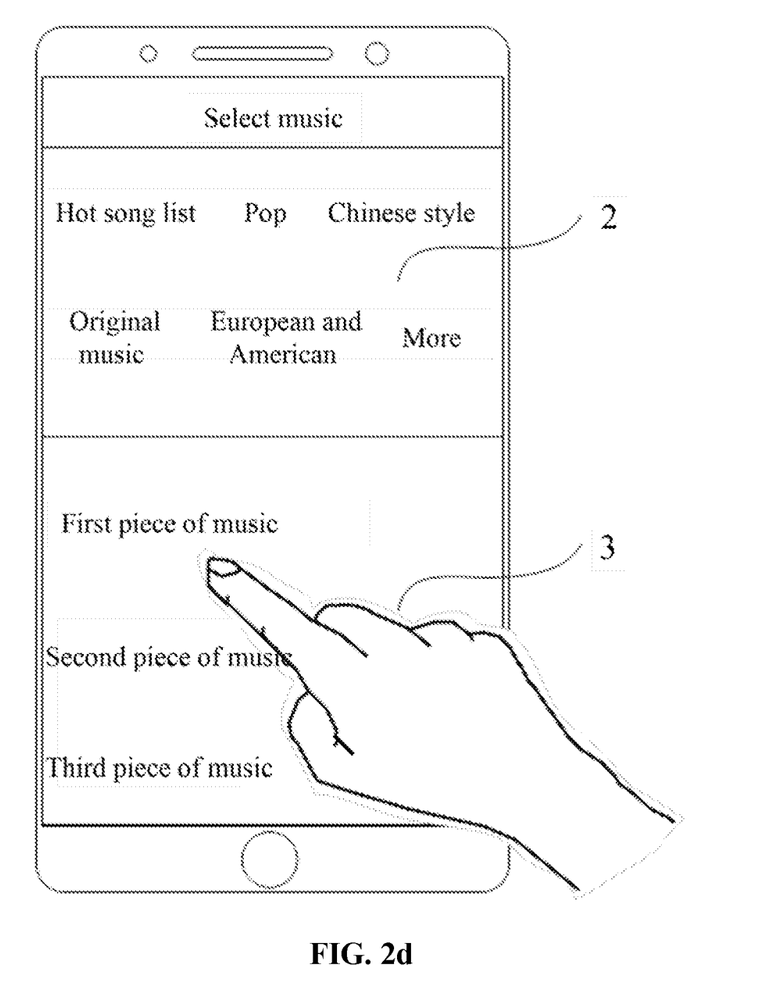
FIG. 2d is a schematic diagram of responding to a scrolling operation of a browsing control according to an embodiment of the present disclosure.
Figure 2E:
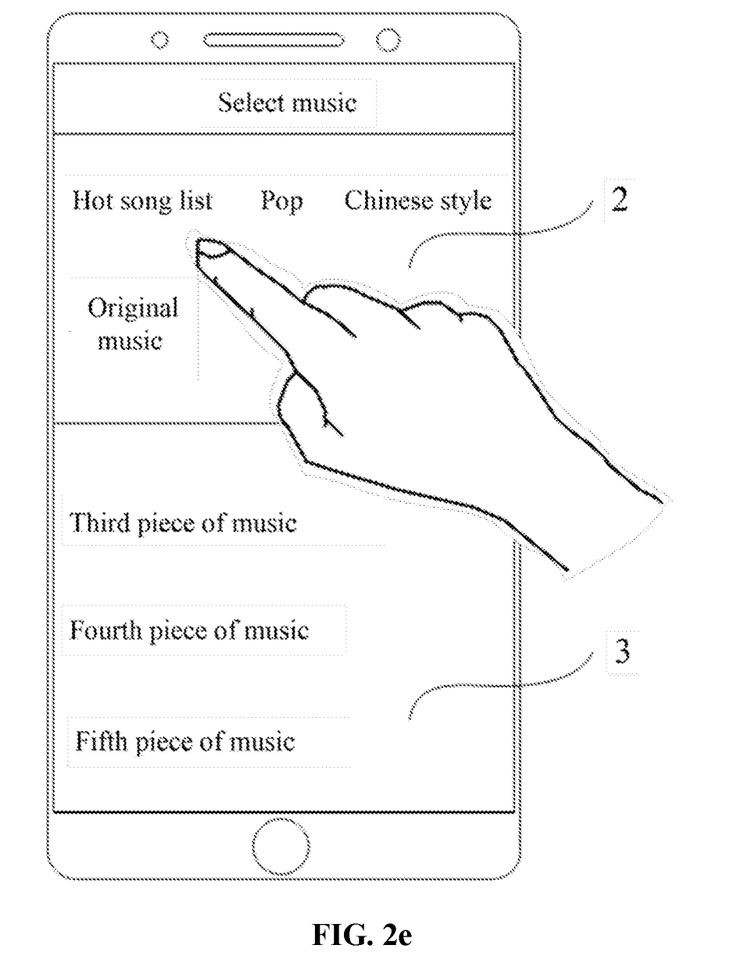
FIG. 2e is a schematic diagram of a sliding gesture located outside an active region of a scrollable browsing control according to an embodiment of the present disclosure.

When the browsing control is non-scrollable and the sliding gesture continues to slide, this gesture is served as the closing gesture of the information flow display panel, the touch point when the browsing control is non-scrollable is served as the sliding starting point of the sliding gesture. When the sliding gesture is located outside the active region of the scrollable browsing control, it can be determined that the starting touch point of the sliding gesture is served as the sliding starting point of the sliding gesture of the information flow display panel. As an example, the information flow display panel is a music selection page. As shown in FIG. 2b, the information flow display region 3 is the active region of the scrollable browsing control, a region outside the active region of the scrollable browsing control, such as the information flow classification display region 2, is a non-active region of the scrollable browsing control, and the trigger gesture of the scrollable browsing control is the down sliding gesture or the up sliding gesture. The set sliding gesture may be the down sliding gesture other than the up sliding gesture, since the up sliding gesture can refresh the information flow in the information flow display panel. As shown in FIG. 2c, the set sliding gesture is the down sliding gesture, and the region where sliding gesture is located is within the information flow display region 3, the information flow display region displays a third piece of music, a fourth piece of music and a fifth piece of music at this time. When the browsing control is scrollable, the scrolling operation of the browsing control is firstly responded, that is, the corresponding information flow is scrollable displayed. As shown in FIG. 2d, when the browsing control is non-scrollable, the information flow display region displays a first piece of music, a second piece of music and the third piece of music at this time, and the non-scrollable touch point is determined as the sliding starting point of the sliding gesture. As shown in FIG. 2e, when the region where the sliding gesture is located is within the information flow classification display region 2, the starting touch point of the sliding gesture is determined as the sliding starting point of the sliding gesture.

Embodiment Two

Figure 3:
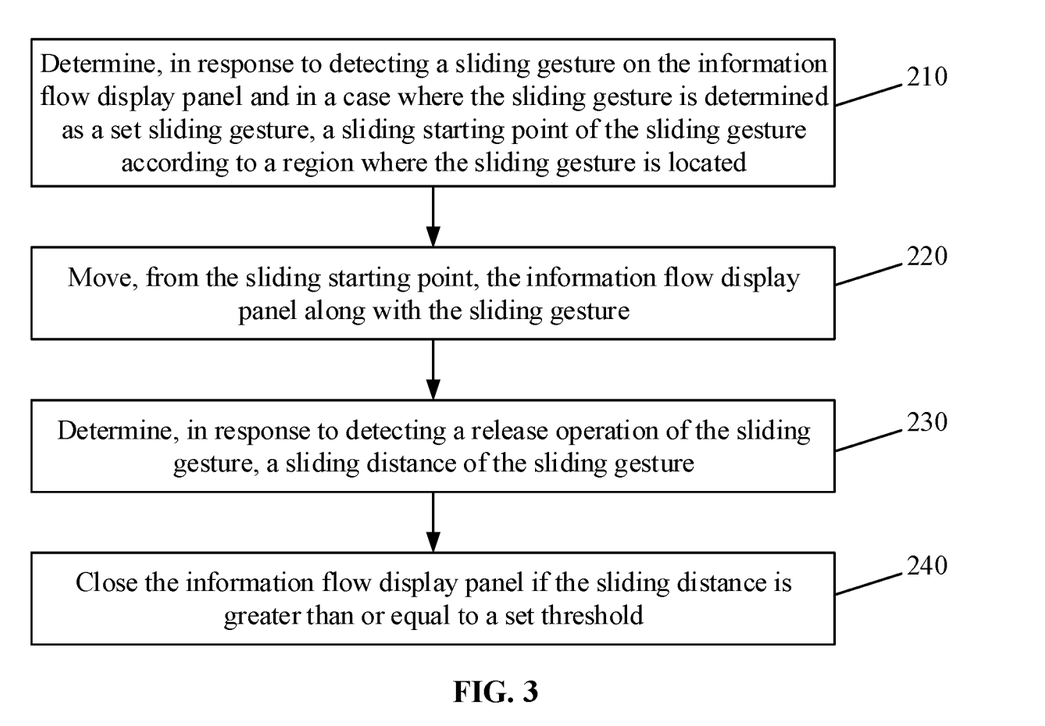
FIG. 3 is a flowchart of a method for controlling information flow display panel according to embodiment two of the present disclosure.

FIG. 3 is a flowchart of a method for controlling information flow display panel according to embodiment two of the present disclosure. After the sliding starting point of the sliding gesture is determined, the method further includes a step described below. The information flow display panel is moved, from the sliding starting point, along with the sliding gesture. The method includes steps S210 to S240.

In step S210, in response to detecting a sliding gesture on the information flow display panel and in a case where the sliding gesture is determined as a set sliding gesture, a sliding starting point of the sliding gesture is determined according to a region where the sliding gesture is located.

In step S220, the information flow display panel is moved, from the sliding starting point, along with the sliding gesture.

Figure 4:
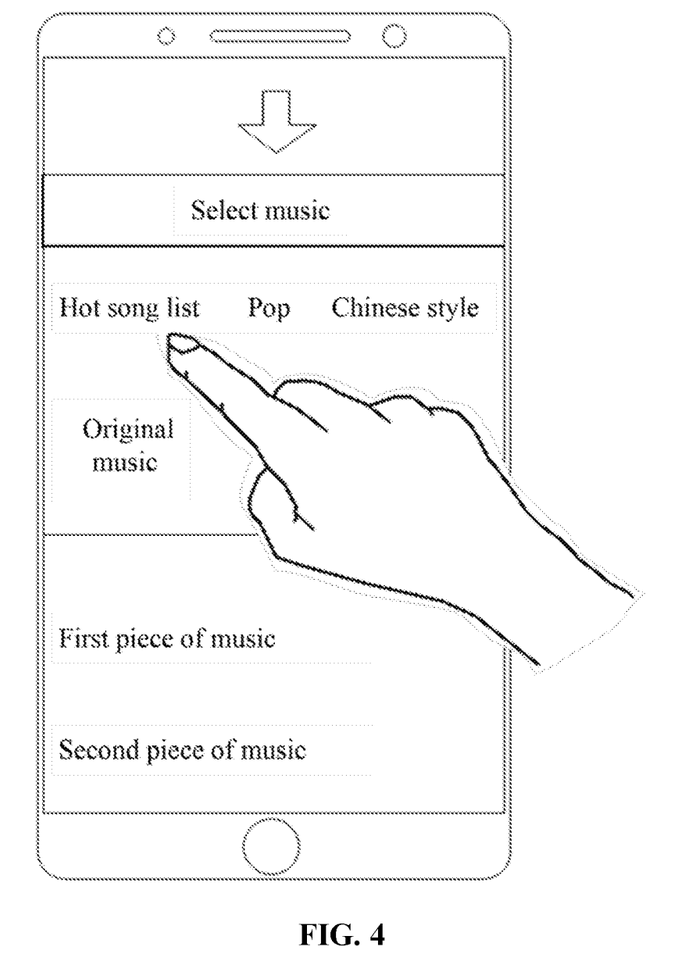
FIG. 4 is a schematic diagram of a pull-down gesture dragging an information flow display panel according to an embodiment of the present disclosure.

The information flow display panel is moved, from the sliding starting point, along with the sliding gesture, and the sliding gesture may drag the information flow display panel until a release operation of the sliding gesture is detected. In a case where the set sliding gesture is a down sliding gesture, which may also be called as a pull-down gesture, that is, dragging the information flow display panel to move along the pull-down gesture. As shown in FIG. 4, the sliding gesture of the user is the pull-down gesture, and the information flow display panel is moved along with the pull-down gesture. A movement distance of the information flow display panel moving along with the sliding gesture is linearly related to a sliding distance of the sliding gesture.

In step S230, in response to detecting a release operation of the sliding gesture, the sliding distance of the sliding gesture is determined.

In step S240, the information flow display panel is closed based on a determination that the sliding distance is greater than or equal to a set threshold.

According to the method for controlling the information flow display panel provided by the embodiment, the information flow display panel is moved, from the sliding starting point, along with the sliding gesture, so that an intuitive display effect that the information flow display panel is moved along with the sliding gesture of the user is achieved, and the interface effect is enriched.

In an embodiment, the method further includes a step described below. The information flow display panel is restored based on a determination that the sliding distance is less than the set threshold.

In a case where the sliding distance is less than the set threshold, it is determined that the user may not want to close the information flow display panel, and the display of the information flow display panel is restored, i.e. the information flow display panel is displayed in a corresponding entire display region. The entire display region is a display region occupied by the application program corresponding to the information flow display panel. In a case where only the application program is currently displayed, the entire display region is the display region of the entire display screen; and in a case where the application program is currently subjected to split-screen display with other application programs, the entire display region is a display region occupied by the application program.

Restoring the information flow display panel includes steps described below. A restoring direction for restoring the information flow display panel is determined according to a sliding direction of the sliding gesture. The information flow display panel is moved to the restoring direction at a preset speed until the information flow display panel is restored.

In a case where the sliding gesture is a closing gesture, the information flow display panel is moved along with the sliding gesture, and the restoring direction of the information flow display panel is opposite to the sliding direction of the sliding gesture during the restoring of the information flow display panel. During a process of restoring the information flow display panel, the information flow display panel is moved to the restoring direction at a preset speed until the information flow display panel covers the corresponding entire display region, so as to realize the display of animation in the restoration process which further enrich the interface effect. In a case where a release operation of the sliding gesture as the closing gesture is an interrupt trigger event, the information flow display panel is restored in a form of animation after the interrupt trigger event is processed.

In an embodiment, closing the information flow display panel includes a step described below. According to the sliding direction of the sliding gesture, the information flow display panel is moved at a preset speed until the information flow display panel is moved out of a display region.

After the sliding starting point of the sliding gesture is determined, the information flow display panel is moved along with the sliding gesture, and a movement direction of the information flow display panel is consistent with the sliding direction of the sliding gesture. In response to detecting the release operation of the sliding gesture, the information flow display panel is continued to move to the sliding direction at a preset speed until the information flow display panel is moved out of the display region, thus achieving the closing of the information flow display panel, so as to realize the display of animation in the restoration process which further enrich the interface effect. In a case where the release operation of the sliding gesture is served as the interrupt trigger event, the information flow display panel is closed in the form of animation after the interrupt trigger event is processed. In response to it is detected that the user clicks a closing button to close the information flow display panel, the information flow display panel may also be closed in the form of animation.

Embodiment Three

Figure 5:
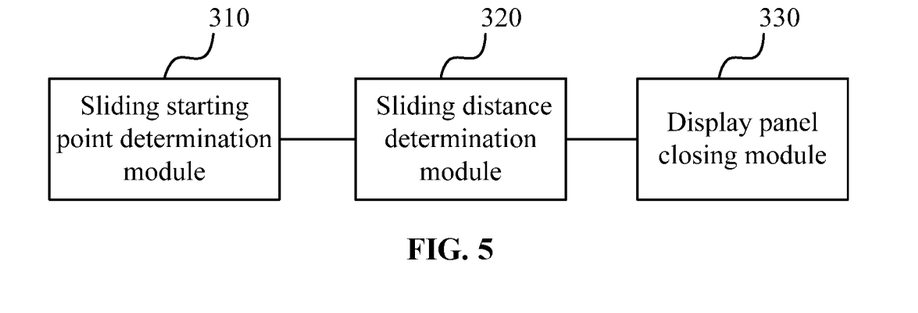
FIG. 5 is a structural diagram of a device for controlling information flow display panel according to embodiment three of the present disclosure.

FIG. 5 is a structural diagram of a device for controlling information flow display panel according to embodiment three of the present disclosure. The present embodiment may be applicable to a case of closing the information flow display panel by a sliding gesture. The device may perform the method for controlling the information flow display panel. The device may be implemented by at least one of software or hardware and may be generally integrated into a terminal. As shown in FIG. 5, the device for controlling information flow display panel provided by the embodiment includes a sliding starting point determination module 310, a sliding distance determination module 320 and a display panel closing module 330.

The sliding starting point determination module 310 is configured to determine, in response to detecting a sliding gesture on the information flow display panel and in a case where the sliding gesture is determined as a set sliding gesture, a sliding starting point of the sliding gesture according to a region where the sliding gesture is located.

The sliding distance determination module 320 is configured to determine, in response to detecting a release operation of the sliding gesture, a sliding distance of the sliding gesture.

The display panel closing module 330 is configured to close the information flow display panel based on a determination that the sliding distance is greater than or equal to a set threshold.

In an embodiment, the device further includes a display panel movement module.

The display panel movement module is configured to move, from the sliding starting point, the information flow display panel along with the sliding gesture.

In an embodiment, the device further includes a display panel restoring module.

The display panel restoring module is configured to restore the information flow display panel based on a determination that the sliding distance is less than the set threshold.

In an embodiment, the display panel restoring module includes a restoring direction determination unit and a display panel restoring unit.

The restoring direction determination unit is configured to determine a restoring direction for restoring the information flow display panel according to a sliding direction of the sliding gesture.

The display panel restoring unit is configured to move the information flow display panel to the restoring direction at a preset speed until the information flow display panel is restored.

In an embodiment, the display panel closing module is configured to move, according to a sliding direction of the sliding gesture, the information flow display panel at a preset speed until the information flow display panel is moved out of a display region.

In an embodiment, the sliding starting point determination module is configured to: in a case where the sliding gesture is located within an active region of a scrollable browsing control, respond to a scrolling operation of the browsing control, and when the browsing control is non-scrollable, determine a corresponding touch point when the browsing control is non-scrollable as the sliding starting point of the sliding gesture; and in a case where the sliding gesture is located outside the active region of the scrollable browsing control, determine a starting touch point of the sliding gesture as the sliding starting point of the sliding gesture.

In an embodiment, the release operation includes a finger lifting operation or receiving an interrupt trigger event.

The above-mentioned device for controlling information flow display panel may perform the method for controlling information flow display panel according to any embodiment of the present disclosure, and has functional modules and beneficial effects corresponding to performing the method. For technical details not described in detail in the present embodiment, it is referred to the method for controlling information flow display panel according to any embodiment of the present disclosure.

Embodiment Four

Figure 6:
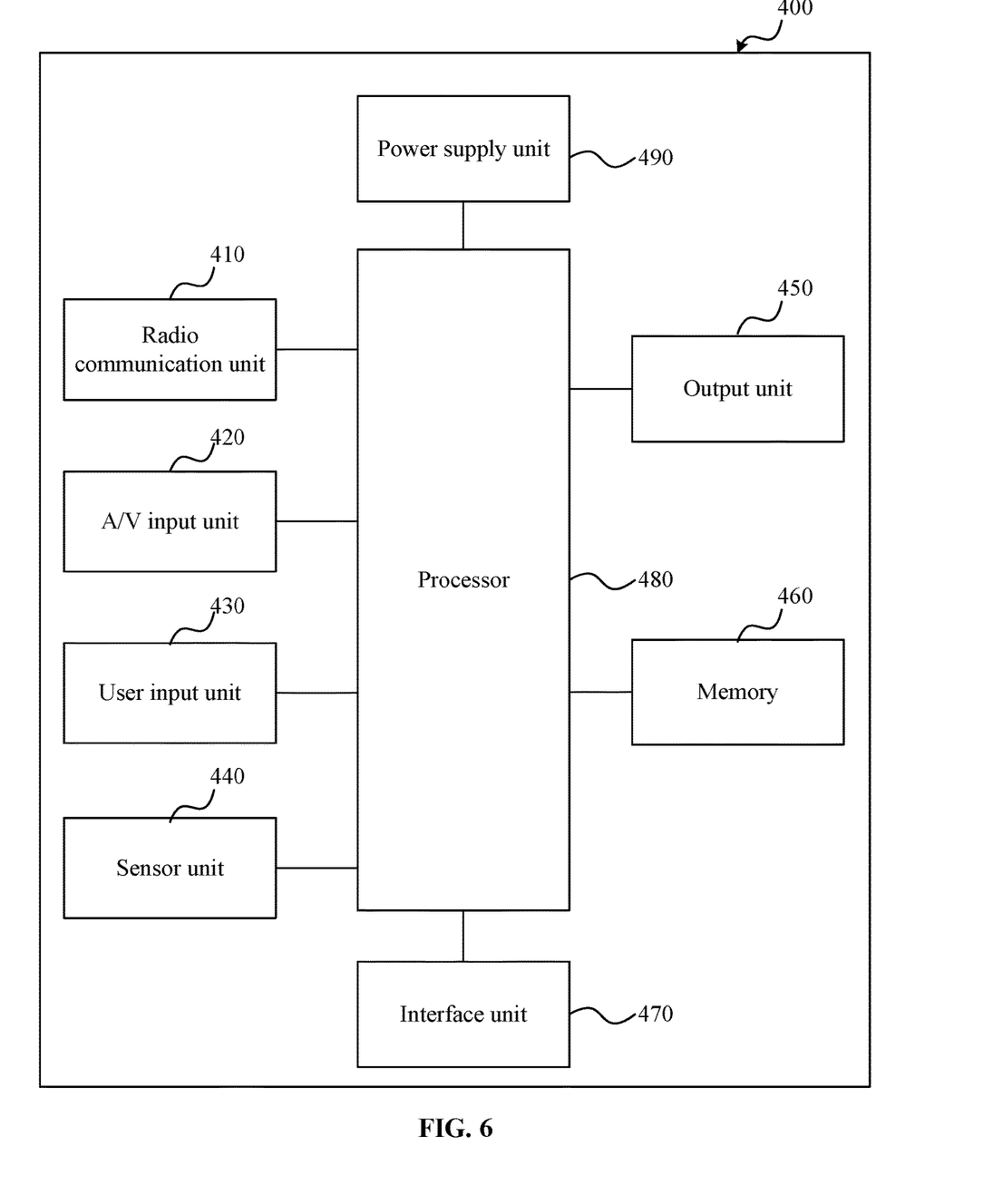
FIG. 6 is a hardware structural diagram of a terminal apparatus according to embodiment four of the present disclosure.

FIG. 6 is a structural diagram of hardware of a terminal apparatus according to embodiment four of the present disclosure. A terminal apparatus may be implemented in various forms. The terminal apparatus in the present disclosure may include, but is not limited to, mobile terminal apparatuses such as a mobile phone, smart phone, a laptop, a digital broadcast receiver, a personal digital assistant (PDA), a portable Android device (PAD), a portable media player (PMP), a navigation device, an in-vehicle terminal apparatus, an in-vehicle display terminal and an in-vehicle electronic rearview mirror, and stationary terminal apparatus such as a digital television (TV) and a desktop computer.

As shown in FIG. 6, the terminal apparatus 400 may include a radio communication unit 410, an audio/video (A/V) input unit 420, a user input unit 430, a sensor unit 440, an output unit 450, a memory 460, an interface unit 470, a processor 480, a power supply unit 490, and the like. Although FIG. 6 shows the terminal apparatus having various elements, it is to be understood that it is not required to implement all the shown elements, and more or fewer elements may be implemented instead.

The radio communication unit 410 allows the terminal apparatus 400 to perform radio communication with a radio communication system or a network. The A/V input unit 420 is configured to receive an audio signal or a video signal. The user input unit 430 may generate key input data according to a command input by a user to control various operations of the terminal apparatus. The sensor unit 440 detects a current state of the terminal apparatus 400, a position of the terminal apparatus 400, a presence or absence of touch input by the user for the terminal apparatus 400, an orientation of the terminal apparatus 400, acceleration or deceleration movement and direction of the terminal apparatus 400, and the like, and generate commands or signals for controlling operations of the terminal apparatus 400. The interface unit 470 serves as an interface through which at least one external device can communicate with the terminal apparatus 400. The output unit 450 is configured to provide an output signal in at least one of a visual manner, an audio manner, or a tactile manner. The memory 460 may store software programs or the like for processing and control operations performed by the processor 480, or may temporarily store data that has been output or will be output. The memory 460 may include at least one type of storage media. The terminal apparatus 400 may cooperate with a network storage apparatus that performs the storage function of the memory 460 via a network connection. The processor 480 usually controls overall operations of the terminal apparatus. In addition, the processor 480 may include a multimedia module for reproducing or playing back multimedia data. The processor 480 may perform a pattern recognition processing to recognize a handwriting input or a picture drawing input performed on a touch panel as characters or images. The power supply unit 490 receives external power or internal power and supplies the appropriate power required for operating respective elements and components under the control of the processor 480.

The processor 480 executes various functional applications and data processing of the terminal apparatus 400 by executing a program stored in the memory 460, for example, the method for controlling information flow display panel provided by the embodiment of the disclosure which includes steps described below. In response to detecting a sliding gesture on the information flow display panel and in a case where the sliding gesture is determined as a set sliding gesture, a sliding starting point of the sliding gesture is determined according to a region where the sliding gesture is located. In response to detecting a release operation of the sliding gesture, a sliding distance of the sliding gesture is determined. The information flow display panel is closed based on a determination that the sliding distance is greater than or equal to a set threshold.

Embodiment Five

Embodiment five of the present disclosure further provides a storage medium storing computer-executable instructions for executing a method for controlling information flow display panel when executed by one or more computer processors. The method includes steps described below. In response to detecting a sliding gesture on the information flow display panel and in a case where the sliding gesture is determined as a set sliding gesture, a sliding starting point of the sliding gesture is determined according to a region where the sliding gesture is located. When a release operation of the sliding gesture is detected, a sliding distance of the sliding gesture is determined. When the sliding distance is greater than or equal to a set threshold, the information flow display panel is closed.

In the storage medium storing computer-executable instructions provided in the embodiment of the present disclosure, the computer-executable instructions implement not only the above-mentioned method operations but also related operations in the method for controlling information flow display panel provided in any embodiment of the present disclosure.

From the above description of embodiments, it will be apparent to those skilled in the art that the present disclosure may be implemented by means of software and necessary general-purpose hardware, or may of course be implemented by hardware, but in many cases the former is a preferred embodiment. Based on this understanding, the solutions provided by the present disclosure substantially, or the part contributing to the related art, may be embodied in the form of a software product. The software product is stored in a computer readable storage medium, such as a computer floppy disk, a read-only memory (ROM), a random access memory (RAM), a flash, a hard disk or an optical disk, and includes several instructions for enabling a computer device (which may be a personal computer, a server or a network device) to execute the method according to each embodiment of the present disclosure.

It should be noted that in the embodiment of the control device of the above information flow display panel, the multiple units and modules included are only divided according to the functional logic, but not limited to the above division, as long as the corresponding functions can be realized. In addition, the specific names of the functional units are just intended for distinguishing, and are not to limit the scope of the present disclosure.

What is claimed is:

1. A method for controlling information flow display panel, comprising:
   determining, in response to detecting a sliding gesture on the information flow display panel and in a case where the sliding gesture is determined as a set sliding gesture, a sliding starting point of the sliding gesture according to a region where the sliding gesture is located;
   determining, in response to detecting a release operation of the sliding gesture, a sliding distance of the sliding gesture; and
   closing the information flow display panel based on a determination that the sliding distance is greater than or equal to a set threshold;
   wherein after determining the sliding starting point of the sliding gesture, the method further comprises:
   moving, from the sliding starting point, the information flow display panel along with the sliding gesture;
   wherein the method further comprises:
   restoring the information flow display panel based on a determination that the sliding distance is less than the set threshold; and
   wherein restoring the information flow display panel comprises:
   determining a restoring direction for restoring the information flow display panel according to a sliding direction of the sliding gesture; and
   moving the information flow display panel to the restoring direction at a preset speed until the information flow display panel is restored.

2. The method of claim 1, wherein closing the information flow display panel comprises:
   moving, according to a sliding direction of the sliding gesture, the information flow display panel at a preset speed until the information flow display panel is moved out of a display region.

3. The method of claim 1, wherein determining the sliding starting point of the sliding gesture according to the region where the sliding gesture is located comprises:
   in a case where the sliding gesture is located within an active region of a scrollable browsing control, responding to a scrolling operation of the browsing control, and when the browsing control is non-scrollable, determining a corresponding touch point when the browsing control is non-scrollable as the sliding starting point of the sliding gesture; and
   in a case where the sliding gesture is located outside the active region of the scrollable browsing control, determining a starting touch point of the sliding gesture as the sliding starting point of the sliding gesture.

4. The method of claim 1, wherein the release operation comprises a finger lifting operation or receiving an interrupt trigger event.

5. A terminal apparatus, comprising:
   a memory configured to store instructions; and
   one or more processors coupled to the memory, the one or more processors configured, in conjunction with execution of the instructions stored in the memory, to:
   determine, in response to detecting a sliding gesture on the information flow display panel and in a case where the sliding gesture is determined as a set sliding gesture, a sliding starting point of the sliding gesture according to a region where the sliding gesture is located;
   determine, in response to detecting a release operation of the sliding gesture, a sliding distance of the sliding gesture; and
   close the information flow display panel based on a determination that the sliding distance is greater than or equal to a set threshold;
   wherein after determining the sliding starting point of the sliding gesture, the one or more processors are further configured to:
   move, from the sliding starting point, the information flow display panel along with the sliding gesture;
   wherein the one or more processors are further configured to:
   restore the information flow display panel based on a determination that the sliding distance is less than the set threshold; and
   wherein the one or more processors are configured to restore the information flow display panel in the following manners:
   determining a restoring direction for restoring the information flow display panel according to a sliding direction of the sliding gesture; and
   moving the information flow display panel to the restoring direction at a preset speed until the information flow display panel is restored.

6. The terminal apparatus of claim 5, wherein the one or more processors are configured to close the information flow display panel in the following manners:
   moving, according to a sliding direction of the sliding gesture, the information flow display panel at a preset speed until the information flow display panel is moved out of a display region.

7. The terminal apparatus of claim 5, wherein the one or more processors are configured to determine the sliding starting point of the sliding gesture according to the region where the sliding gesture is located in the following manners:
   in a case where the sliding gesture is located within an active region of a scrollable browsing control, responding to a scrolling operation of the browsing control, and when the browsing control is non-scrollable, determining a corresponding touch point when the browsing control is non-scrollable as the sliding starting point of the sliding gesture; and
   in a case where the sliding gesture is located outside the active region of the scrollable browsing control, determining a starting touch point of the sliding gesture as the sliding starting point of the sliding gesture.

8. The terminal apparatus of claim 5, wherein the release operation comprises a finger lifting operation or receiving an interrupt trigger event.

9. A non-transitory computer-readable storage medium, which is configured to store a computer program, wherein the computer program, when executed by at least one processor, performs steps of:
   determining, in response to detecting a sliding gesture on the information flow display panel and in a case where the sliding gesture is determined as a set sliding gesture, a sliding starting point of the sliding gesture according to a region where the sliding gesture is located;

determining, in response to detecting a release operation of the sliding gesture, a sliding distance of the sliding gesture; and closing the information flow display panel based on a determination that the sliding distance is greater than or equal to a set threshold;

wherein after determining the sliding starting point of the sliding gesture, the computer program further performs a step of:

moving, from the sliding starting point, the information flow display panel along with the sliding gesture;

wherein the computer program further performs a step of:

restoring the information flow display panel based on a determination that the sliding distance is less than the set threshold; and wherein restoring the information flow display panel comprises:

determining a restoring direction for restoring the information flow display panel according to a sliding direction of the sliding gesture; and moving the information flow display panel to the restoring direction at a preset speed until the information flow display panel is restored.

10. The non-transitory computer-readable storage medium of claim 9, wherein closing the information flow display panel comprises:

moving, according to a sliding direction of the sliding gesture, the information flow display panel at a preset speed until the information flow display panel is moved out of a display region.

11. The non-transitory computer-readable storage medium of claim 9, wherein determining the sliding starting point of the sliding gesture according to the region where the sliding gesture is located comprises:

in a case where the sliding gesture is located within an active region of a scrollable browsing control, responding to a scrolling operation of the browsing control, and when the browsing control is non-scrollable, determining a corresponding touch point when the browsing control is non-scrollable as the sliding starting point of the sliding gesture; and in a case where the sliding gesture is located outside the active region of the scrollable browsing control, determining a starting touch point of the sliding gesture as the sliding starting point of the sliding gesture.

* * * * *